United States Patent
Rosenbaum

[19]

[11] Patent Number: 5,825,599
[45] Date of Patent: Oct. 20, 1998

[54] GROUND FAULT CIRCUIT INTERRUPTER SYSTEM WITH UNCOMMITTED CONTACTS

[75] Inventor: Saul Rosenbaum, East Meadow, N.Y.

[73] Assignee: Leviton Manufacturing Co., Inc., Little Neck, N.Y.

[21] Appl. No.: 851,518

[22] Filed: May 5, 1997

[51] Int. Cl.⁶ .................................................. H02H 3/16
[52] U.S. Cl. ............................................ 361/45; 340/651
[58] Field of Search .......................... 324/424; 340/635, 340/638, 644, 650, 651, 652, 654; 361/42–50

[56] References Cited

U.S. PATENT DOCUMENTS 5,173,831  12/1992  Sammartano ............................. 361/45
5,654,857   8/1997  Gershen ................................... 361/42

*Primary Examiner*—Ronald W. Leja
*Attorney, Agent, or Firm*—Paul J. Sutton

[57] ABSTRACT

A ground fault circuit interrupt system with uncommitted contacts is provided which includes line-side system, phase, neutral and ground terminals electrically connectable to phase, neutral and ground terminals of an AC power source and load-side system, phase, neutral and ground terminals electrically connectable, respectively, to phase, neutral and ground terminals of an electrical load. The system includes a ground fault circuit interrupter including line- and load-side phase and neutral terminals for electrical connection to the line-side system, phase and neutral terminals for controlling a state of conduction of AC current between the source and electrical load in accordance with a detection of an interrupt condition. A relay switch is also included which has a relay coil and phase and neutral contacts such that line and load ends of the phase contact are electrically connected, respectively, to a GFCI load-side phase terminals and load-side system, phase terminal, line and load ends of the neutral contact are electrically connected, respectively, to a GFCI load-side neutral terminal and load-side system, neutral terminal; and the relay coil is electrically coupled between the load ends of the phase and neutral contacts for controlling said contacts in response to the interrupt condition.

3 Claims, 1 Drawing Sheet

GROUND FAULT CIRCUIT INTERRUPTER SYSTEM WITH UNCOMMITTED CONTACTS

BACKGROUND OF THE INVENTION

1. Field of the Invention

The instant invention relates to ground fault circuit interrupter (GFCI) systems and more particularly to GFCI devices which include uncommitted contacts for remotely monitoring an operational state of such GFCI device.

2. Description of the Prior Art

Ground fault circuit interrupters were developed to meet a great need for a device capable of detecting the presence of abnormal current flow within a circuit system made up of a number of branches. Such abnormal current flow could include faulted current flow between the phase conductor and ground. Upon detection of such abnormal currents it is necessary to immediately interrupt the flow of current to the faulted branch to protect persons from possible electric shock, fire and explosion.

Prior to the GFCI development, differential circuit breakers were known and used in certain European countries to provide ground fault protection to circuit systems. Differential circuit breakers include a differential transformer with a core through which the two conductors connecting the circuit system to the phase and neutral lines of an AC power source are passed to monitor the conductors for abnormal current flow. The two conductors act essentially as the primary windings on such core. The differential circuit breaker also includes switch elements, which, in the event of a detected short circuit or abnormal leakage current can be caused to open to interrupt current flow to the faulted circuit. The state of the switch, open or closed can be controlled by a device which is energized or deenergized by the secondary windings of the differential transformer. Such devices, however, are found to be current-sensing insensitive and, therefore, ineffective to insure complete protection for human life.

GFCIs evolved from differential circuit breaker technology. GFCIs essentially comprise a current sensor with a circuit breaker connected between neutral and phase conductors, interposed between a power source and a load. GFCIs also include a differential transformer circumscribing the neutral and phase conductors. The circuit breaker is actuated when the differential transformer senses that more current is flowing into the load from the AC power source through the phase conductor than is flowing back to the AC power source through the neutral conductor, functioning essentially as primary and secondary windings on the differential transformer. A tertiary winding of the differential transformer is disposed proximate the neutral conductor in the vicinity of the load in which a current is induced in the event of a grounding (i.e., a sensed current imbalance). If the induced current is large enough, the circuit breaker contacts are opened.

One known GFCI system includes a differential transformer comprised of a toroidal core through which several line conductors pass to form primary windings of at least one turn. A secondary winding of the differential transformer serves as an output winding is also connected to a GFCI circuit. A trip coil of a circuit breaker having a plurality of contacts in line with the line conductors is energized with a minimum current. A pulse generator is coupled to the neutral conductor for producing a high frequency current upon grounding of the neutral conductor between the differential transformer and the load. The high frequency current is produced by the periodic firing of a diac when a voltage on a capacitor connected thereto is applied to the output winding. The high frequency pulses induce voltage pulses in the neutral conductor passing through the transformer core. The induced voltage pulses do not effect the current balance in the distribution system as long as the neutral conductor is not grounded on the load side of the transformer. If a grounding occurs, however, the voltage pulses produce a current in the neutral conductor which does not appear in any of the line conductors. A consequential imbalance is detected by the ground fault sensing means and the contacts are opened, interrupting the flow of current in the distribution system.

A variation on a conventional GFCI is an intelligent ground fault circuit interrupter (IGFCI) system, disclosed in commonly owned U.S. Pat. No. 5,600,524 issued Feb. 4, 1997 and incorporated herein by this reference. The IGFCI system includes a GFCI, a differential transformer through which a pair of conductors pass and switching means in line with the conductors and responsive to the GFCI. The switching means define either a conductive or non-conductive state in accordance with system current flow balance. Included detection circuitry determines a miswiring condition in the system whether the switching means is in a closed or open circuited state. The system also includes test means which alert the user to a need to test the device and which actually implements the required testing.

Another variation of the conventional GFCI circuitry includes a GFCI with transient voltage surge suppression (TVSS) ability. Such ability is typically implemented by placing a TVSS device between phase and neutral conductors therein, i.e., providing single node protection. The TVSS device which may be a metal oxide varistor (MOV), protects the GFCI and connected circuitry from transient overvoltages. While GFCIs, regardless of whether they offer surge suppression protection or not, offer protection against excess ground fault or leakage current by "cutting off" current flow to the faulty circuit, system power "shut down" in the event of such leakage current detection is at times unacceptable and especially where no alarm or other indication of circuit or system shut down is given. For example, a GFCI outlet could be used to provide power to an appliance or pump, such as a medical pump, the cessation of which could prove disastrous. A GFCI device, the operable or conductive state of which could be monitored or communicated, would, therefore, be well received. In particular, a GFCI device which includes a terminal or terminals at which a signal indicative of its operable state is continuously monitored from a remote location would provide additional safety for a device coupled to such a GFCI.

SUMMARY OF THE INVENTION

The instant invention overcomes the difficulties noted above with respect to prior art GFCI devices and systems. This is done by providing a GFCI with uncommitted terminals which can be coupled to a remote monitor from which the state of operation of the GFCI can be determined. A monitor can be coupled to the GFCI's output terminals to detect the presence or absence of current being supplied to an electrical load from an AC power source. The flow of current showing that the system is functioning properly whereas the absence of current shows that the GFCI has operated to prevent the flow of current to the electrical load. A monitor could also be attached to the GFCI terminal to detect the presence or absence of a fault or excess leakage current based upon the presence or absence of a fault signal from the GFCI. It is therefore an object of the instant invention to provide a GFCI system which overcomes the shortcomings of prior art devices.

It is another object of the instant invention to provide a GFCI system which can be remotely monitored to determine its state of operation.

It is yet another object of the instant invention to provide a GFCI system with uncommitted terminals to which a remote monitor can be coupled to communicate information about the status of the GFCI protected circuit.

Other objects and features of the invention will be pointed out in the following description and claims and illustrated in the accompanying drawings, which disclose, by way of example, the principals of the invention, and the best mode which is presently contemplated for carrying them out.

DESCRIPTION OF THE PREFERRED EMBODIMENT

Figure 1:
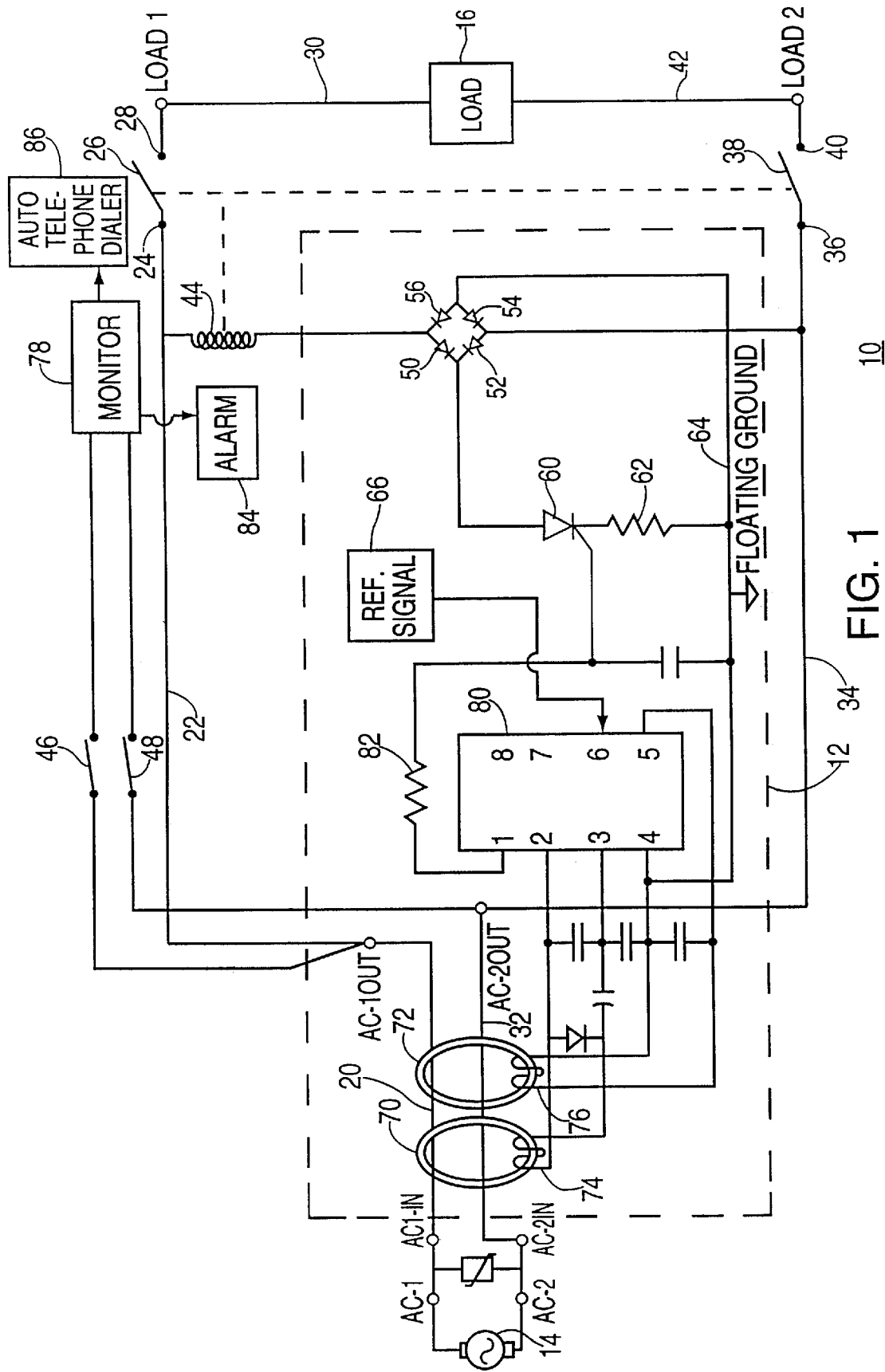
FIG. 1 is a schematic diagram of a GFCI system according to the concepts of the instant invention.

The present invention provides a ground fault circuit interrupter system which includes a ground fault circuit interrupter (GFCI) for electrical connection between an AC power source and an electrical load. The GFCI controls the state of current conduction between such source and such load in accordance with the absence or presence of an interrupt condition. The system also includes uncommitted terminals of the GFCI circuitry which provide access for monitoring or communicating the state of current conduction to the protected electrical load, that is whether current is flowing to the electrical load or not.

The GFCI is electrically connected to phase and neutral terminals of the AC power source via phase and neutral terminals. The GFCI acts in conjunction with a relay switch which includes a relay coil and phase and neutral line contacts for controlling the state of the current paths between the AC power source and the electrical load. Line and load ends of the phase conductor are electrically connected, respectively, to the GFCI line-side phase terminal and a GFCI load-side phase terminal for connection to a phase terminal of a load. Line and load ends of the neutral conductor are electrically connected, respectively, to a GFCI line-side neutral terminal and a GFCI load-side neutral terminal for connection to a neutral terminal of the load. The relay switch controls contacts in the path between the GFCI load-side phase terminal and the phase terminal of the electrical load and the path between the GFCI load-side neutral terminal and the neutral terminal of the electrical load. The relay coil responds to an interrupt signal generated in the GFCI due to a detected difference in current flowing through the phase and neutral conductors and operates the phase and neutral contacts to open the paths to the phase and neutral terminals of the load. A further set of contacts, uncommitted contacts, are also electrically connected, respectively, to the GFCI line side phase and neutral terminals. The uncommitted contacts are preferably in a continuously closed state to permit the continuous monitoring of the GFCI operation. Such uncommitted contacts are ideally suited to the remote monitoring of the state of the GFCI protected circuit to permit rapid remediation of any existing problems.

FIG. 1 shows a ground fault circuit interrupter system 10 constructed in accordance with the concepts of the invention. A ground fault circuit interrupter (GFCI) 12 is shown within the dotted lines connected between an AC power source 14 and an electrical load 16. The phase conductor and neutral conductor of AC power source 14 are connected to system phase and neutral terminals AC-1 and AC-2, respectively. The system phase terminal AC-1 is connected to the phase line terminal AC-1 IN of the GFCI while the system neutral terminal AC-2 is connected to the neutral line terminal AC-2 IN of the GFCI 12. A transient voltage surge suppressor (TVSS) device or metal oxide varistor (MOV) 18 is preferably electrically connected across AC-1 and AC-2 for overvoltage protection thereat. A first conductor 20 connects GFCI 12 phase input terminal AC-1 IN to GFCI 12 phase output terminal AC-1 OUT. The phase output terminal AC-1 OUT is coupled by a conductor 22 to the line side 24 of movable relay contact 26 whose load side 28 is coupled to the phase line 30 of load 16. A third conductor 32 connects GFCI 12 neutral input terminal AC-2 IN to GFCI 12 neutral output terminal AC-2 OUT. The neutral output terminal AC-2 OUT is coupled by a conductor 34 to the line side 36 of movable relay contact 38 whose load side 40 is coupled to the neutral line 42 of load 16. The movable relay contacts 26, 38 are controlled by the relay coil 44 as will be described below. A pair of uncommitted contacts, phase contact 46 and neutral contact 48 are coupled to phase output terminal AC-1 OUT and neutral output terminal AC-2 OUT, respectively.

Conductors 20 and 32 extend through a pair of toroidal magnetic cores 70, 72 which sense and generate signals in accordance with the AC current flowing into and out of the load. Terminal AC-1 OUT is also coupled via conductor 22 to a first end of relay coil 44, the second end of which is electrically connected to the anode of diode 50 and the cathode of a diode 56, which together with diodes 52, 54, form a portion of a diode bridge. The cathodes of diodes 50, 52 are electrically connected to the anode of silicon controlled rectifier (SCR) 60. The cathode of SCR 60 is coupled to a resistor 62 which in turn is coupled by conductor 64 to a floating ground. The anode of diode 52 and the cathode of diode 54 are also electrically connected to the line side 36 of the movable relay contact 38. The anodes of diodes 54 and 56 are also coupled to conductor 64, while the anode of diode 52 and the cathode of diode 54 are connected to conductor 34.

The conductors 20 and 32 extending through cores 70 and 72 act as one turn primary windings. A secondary winding 74 is placed about core 70 and a secondary winding 76 is placed about core 72. The signal induced in winding 74 is proportional to the flux produced by the current flowing in conductor 20 from AC power source 14 to load 16. This signal is applied to pins 2 and 3 of an integrated circuit device (e.g. an LM 1851) 80. The integrated circuit device 80 can detect small differences in current flowing through the AC-1 and AC-2 terminals, identifying ground faults thereby. The induced current in winding 76 is proportional to the flux produced by the current flowing in conductor 32 from load 16 to the AC power source 14. This signal is applied to pins 4 and 5 of the integrated circuit device 80. The integrated circuit device 80 can also detect excessive leakage currents.

The integrated circuit device 80 produces a difference signal indicative of the difference in current at its terminals 2 and 3 and 4 and 5 and produces a difference signal proportional to this difference. The difference signal is compared to the signal supplied by a reference signal generator 66 and indicative of the maximum allowable difference. If the difference signal exceeds the reference signal or the integrated circuit device 80 detects an excessive leakage current, the integrated circuit device 80 provides a signal at pin 1. This signal is applied via resistor 82 to the gate of SCR 60 causing it to change from its non-conductive state to its conductive state. Current from conductor 22 can now pass through relay coil 44, diode 50, SCR 60 and resistor 62 to floating ground via conductor 64. The flow of current through relay coil 44 causes the movable relay contacts 26 and 38 to open thus removing the load 16 from its coupling to the AC power source 14. Neutral line current flows from the lead to pin 4, via diode 54 to conductor 34, conductor 32 to the AC-2 terminal.

The normally closed contacts 46, 48 permit a monitor 78 to be attached to the GFCI 12 output terminals AC-1 OUT and AC-2 OUT to monitor the flow of current through the GFCI 12 to the load 16. If current is flowing in conductors 22, 34 then the GFCI 12 has not detected a fault condition or excess leakage current. If current is not flowing in conductors 22, 34 then the GFCI 12 has operated and a condition which must be corrected exists. The monitor 78 can be an oscilloscope, a current measuring device or a voltage level detector. As an alternative, a suitable detector could be coupled to pin 1 of integrated circuit device 80 to produce an output when a fault condition or excess leakage current is detected. The monitor 78 or the lines of closed contacts 46, 48 could be coupled to an alarm device 84 which can produce an audible or visual signal or both. An automatic telephone dialer 86 for dialing an emergency telephone number can also to coupled to said monitor 78.

The interruption of current flow to or from a load could also serve as an indication that some downstream load device has ceased to operate and is not drawing the expected amount of current. The described GFCI system 10 will not only monitor downstream devices but will also monitor outlets which are part of the GFCI itself.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

I claim:

1. A ground fault circuit interrupter device with remote sensing ability comprising:

a) a ground fault circuit interrupter (GFCI) means including line and load side phase and neutral terminals and a relay switch for controlling current flow between an AC source and a electrical circuit to be protected in accordance with the detection of an interrupt condition;

b) said GFCI means comprising first means for detecting a first current flowing from said AC source to said electrical circuit, second means for detecting a second current flowing from said electrical circuit to said AC source and an integrated circuit device to provide an output signal proportional to any difference between said first current and said second current and including comparing means to receive said output signal;

c) a reference signal generator for generating a reference signal indicative of the maximum allowable difference between said first and second currents, said reference signal generator coupled to said integrated circuit device to provide said reference signal thereto;

d) said comparing means of said integrated circuit device comparing said output signal with said reference signal and providing an interrupt signal if said output signal exceeds said reference signal;

e) said relay switch includes a relay coil, a selectively movable phase contact having a line and a load end and a selectively movable neutral contact having a line and a load end;

f) said line and load ends of said selectively movable phase contact are electrically connected to said load side phase terminal of said GFCI means and to a phase terminal of said electrical circuit, respectively;

g) said line and load ends of said selectively movable neutral contact are electrically connected between a load side neutral terminal of said GFCI means and a neutral terminal of said electrical circuit, respectively;

h) said relay coil is electrically coupled between said line ends of said selectively movable phase and selectively movable neutral contacts for moving said contacts in response to the receipt of said interrupt condition; and i) two electrical contacts electrically connected to said GFCI means such that a signal present at said electrical contacts may be continuously monitored to determine a state of current flow through said GFCI means phase and neutral contacts.

2. The ground fault circuit interrupter device defined by claim 1, wherein one of said two electrical contacts comprises a first line side phase terminal and a first load side phase terminal, wherein said first line side phase terminal is electrically connected to said GFCI means line side phase terminal and said first load side phase terminal is electrically connected to a monitoring device, and the other of said two electrical contacts comprises a second line side neutral terminal and a second load side neutral terminal, wherein said second line side neutral terminal is electrically connected to said GFCI means line side neutral terminal and said second load side neutral terminal is electrically connected to said monitoring device.

3. A method for protecting an electrical device from ground faults utilizing a ground fault circuit interrupter (GFCI) wherein an operable state of said GFCI is continuously monitored for maintaining the operable integrity of said electrical device and wherein said GFCI is electrically connected between an AC power source and said electrical device comprising the steps of:

a) detecting a first amount of AC current flowing from said AC power source to said electrical device utilizing said GFCI;

b) detecting a second amount of AC current flowing from said electrical device to said AC power source utilizing said GFCI;

c) generating a difference signal indicative of a difference between said first and second amounts of AC current flowing;

d) comparing said difference signal to a reference signal which is proportional to the maximum allowable difference in current flow and defining an interrupt condition when said difference signal exceeds said reference signal;

e) maintaining a pair of uncommitted contacts at a portion of said GFCI to permit the monitoring of a state of current flow therethrough; and f) interrupting said flow of AC current between said AC power source and said electrical device upon the occurrence of said interrupt condition such that an operable state signal indicating the same is present at said uncommitted contacts.

* * * * *